June 24, 1969 G. A. KNORR, JR 3,452,243

PINCUSHION CORRECTION CIRCUITS

Filed Oct. 23, 1967 Sheet 1 of 2

WITNESSES:

Helen M. Farkas

Wm. B. Sellers

INVENTOR

Gustave A. Knorr, Jr.

BY

ATTORNEY

United States Patent Office 3,452,243

Patented June 24, 1969

3,452,243

PINCUSHION CORRECTION CIRCUITS

Gustave A. Knorr, Jr., Atlantic Highlands, N.J., assignor to Westinghouse Electric Corporation, Pittsburgh, Pa., a corporation of Pennsylvania Filed Oct. 23, 1967, Ser. No. 677,301
Int. Cl. H01j 29/70
U.S. Cl. 315—24 13 Claims

ABSTRACT OF THE DISCLOSURE

The present disclosure relates to pincushion correction circuits for use in a television receiver wherein the B-boost voltage having a substantially parabolic waveshape and varying at the horizontal line rate is utilized to modulate a vertical sawtooth waveform. The modulated waveform is applied to a switching device which is biased to permit only portions of the modulated waveform exceeding the reference level to pass therethrough. These portions are applied through a transformer which is tuned to the horizontal rate and which provides in response thereto a correction waveform to be applied to the vertical deflection system for effecting pincushion correction.

*Background of the invention*

The present invention relates to distortion correcting circuitry and, more particularly, to pincushion distortion correcting circuitry for use in television receivers.

Pincushion distortion occurs on the cathode ray tube display of a television receiver due to the curvature of the picture tube face and the deflection angle if linear scanning currents are utilized. If the scanning currents are left unmodified, a frame of the display takes a pincushion shape with the top and bottom and sides of the frame being bowed toward the center of the picture tube face. To compensate for the bowing or pincushion effect, the scanning currents as applied to the deflection system of the receiver must somehow be modified. Various schemes have been employed for modifying the scanning currents including magnetic modulating techniques requiring somewhat complex electromagnetic circuitry and also tube and transistor circuitry wherein the deflection current waveform is modified by modulating the input to the tube or transistor stage. These circuits have a number of drawbacks including the complexity of the magnetic modulator design and the limited adjustability of the tube or transistor types.

Because of the angle of viewing, pincushion distortion as seen by a viewer at the bottom portion of a picture tube is less than as seen by the viewer at the top of the picture tube. Therefore, in many television receivers, for economy, it may be desirable only to provide pincushion correction at the top of the raster where the distortion is the greatest and still provide a sufficiently high quality display. In certain instances, however, it may be necessary to provide pincushion correction at both top and bottom of the picture tube to provide a very high quality display. In these cases it would moreover be highly desirable if independent control of the top and bottom pincushion correction could be provided due to the different degrees of distortion at the top and bottom of a typical display.

*Summary of the invention*

It is therefore an object of the present invention to provide new and improved pincushion correction circuitry.

It is a further object of the present invention to provide new and improved pincushion correction circuitry for use in a television receiver wherein top, top and bottom or top or bottom pincushion distortion may be corrected.

Broadly, the present invention provides a pincushion correction circuit for use in a television receiver wherein a parabolic waveform varying at the horizontal line rate is utilized to modulate the vertical sawtooth. The modulated waveform is applied to a switching device which is biased to permit only portions of the modulated waveform differing from a reference level to pass therethrough. In response to these portions a correction waveform is applied to the vertical deflection system of the television receiver for providing pincushion correction thereto.

*Description of the preferred embodiments*

Figure 1:
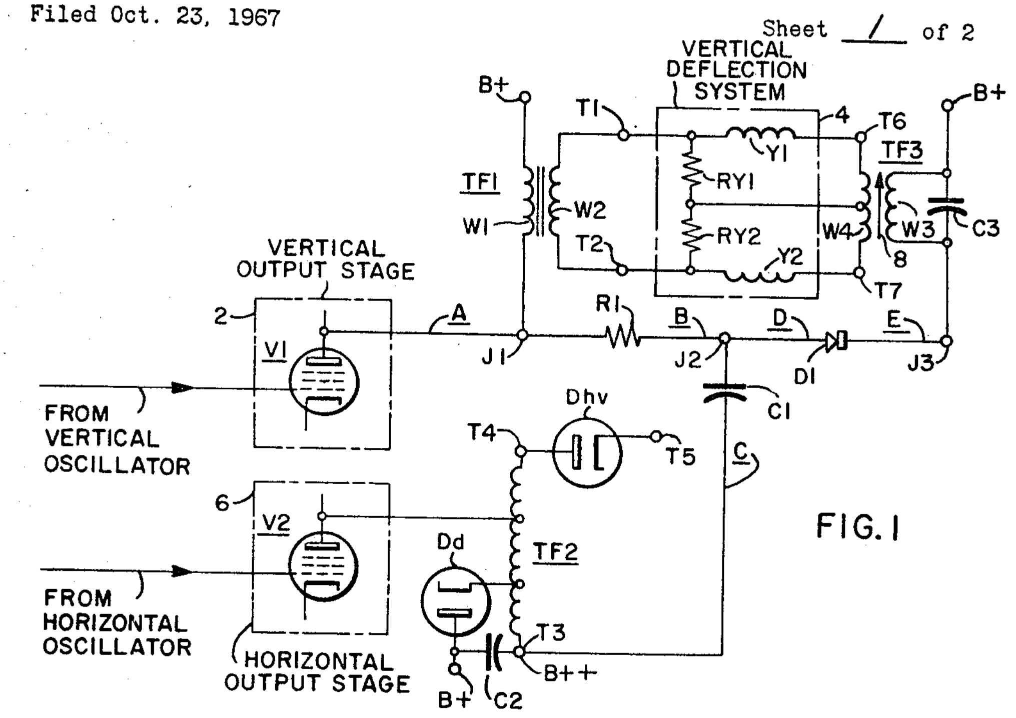
FIGURE 1 is a schematic diagram of a first embodiment of the present invention.

Referring now to the schematic diagram of FIG. 1 and the waveform diagrams of FIGS. 2A through 2E, the first embodiment will be described which provides vertical pincushion correction at the top portion of a cathode ray tube. Only the portions of a television receiver pertinent to the present invention are shown in FIG. 1. The circuitry as shown may be incorporated into any standard monochrome or color television receiver.

Figure 2A:
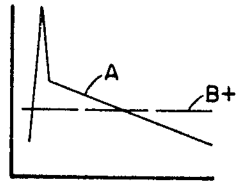
FIGS. 2A, 2B, 2C, 2D and 2E are waveform diagrams used in explaining the operation of FIG. 1.
Figure 4A:
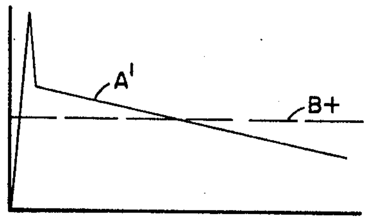
FIGS. 4A, 4B, 4C and 4D are waveform diagrams utilized in explaining the operation of FIG. 3.

As shown in FIG. 1 a vertical output stage 2 is provided including a vertical output tube V1. The vertical output stage 2 is supplied from a vertical oscillator so that an output waveform such as shown in the curve A of FIG. 2A is provided at the point A in FIG. 1. The waveform shown in FIG. 2A comprises a standard vertical output waveform including a retrace spike and a vertical sawtooth. A vertical output transformer TF1 is provided including a primary winding W1 connected between the anode of the vertical output tube V1 at a junction J1 and a source of B+ potential. The vertical output transformer TF1 includes a secondary winding W2 with output terminals T1 and T2 connected at the ends thereof. The vertical sawtooth waveform A is thus applied to the vertical output transformer TF1 via the primary winding W1 thereof and translated through to the secondary winding W2 to appear at the terminals T1 and T2 which supply the vertical deflection system 4 of the television receiver. The vertical deflection system comprises a standard arrangement including coils Y1 and Y2 and resistors RY1 and RY2. The terminal T1 is connected to the junction yoke Y1 and resistor RY1, with the terminal T2 connected to the junction between the yoke Y2 and the ressitor RY2. A conductor is connected between the connection of the resistors RY1 and RY2 and the center tap of W4.

The vertical sawtooth waveform A as shown in FIG. 2A is thus applied as one input to the vertical deflection system 4. If the sawtooth waveform of curve A is not modified in some way so that the beam motion in the vertical direction is periodically reduced as the beam position approaches the left or right side of the raster, a vertical pincushion distortion will result due to the curvature of the screen of the cathode ray tube. To compensate for the pincushion distortion at the top of the picture tube, the circuitry of FIG. 1 is utilized to generate a correction waveform. This is done in the following manner.

Figure 2B:
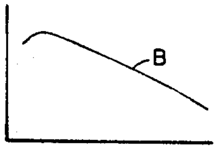

The waveform A appearing at the junction J1 is applied to a passive network including a resistor R1, a capacitor C1 and a diode D1 to be integrated therein. The resistor R1 is connected between the junction J1 and a junction J2. The capacitor C1 is connected between the junction 12 and a terminal T3. The diode D1 is connected with its anode to the junction J2 and its cathode to a junction J3. The integrated waveform appears at the point B at the junction J2 in FIG. 1 and is shown in FIG. 2B. The integration of the waveform A of FIG. 2A thereby eliminates the retrace portion of the vertical waveform provides a substantially linear sawtooth. The terminal T3 is at the low voltage end of a high voltage transformer TF2. The high voltage transformer TF2, as is well known, is included in the horizontal deflection portion of a television receiver for the development of a high direct voltage for supplying the anode of the cathode ray tube. The high voltage transformer TF2 is supplied from a horizontal output stage 6 which includes a horizontal output tube V2 which is supplied from a horizontal oscillator. As is well known the horizontal oscillator supplies gating pulses to the horizontal output tube V2 to control its conductive period so that the horizontal deflection current at the horizontal line frequency of 15,750 Hz. is generated. A damper diode D*d* is connected with its anode to a source of B+ potential and its cathode to a tap on the high voltage transformer TF2 to provide a current path in the opposite direction to the conductive direction of the horizontal output tube V2. Whenever the horizontal output tube V2 is turned off the current path therethrough is opened so that a high voltage is induced at the high voltage end of the transformer TF2 at a terminal T4 which is rectified in a high voltage rectifier D*hv* to appear as the high voltage output at a terminal T5 which is supplied to the anode of the cathode ray tube.

Figure 2C:
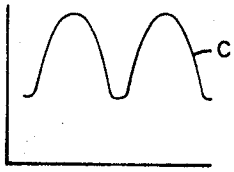

In FIG. 1 a source of B-boost voltage B++ is shown developed at the terminal T3 at the low voltage end of the high voltage transformer TF2. In order to develop the B-boost voltage B++, which is at a higher value than the B+ value, a boost capacitor C2 is connected between the low voltage end T3 and the B+ source. Thus when the horizontal output tube V2 is turned off the capacitor C2 is charged to a higher voltage level at the terminal T3 with respect to the B+ end so that a B-boost voltage B++ appears which is of a higher potential than the B+ source. The generation of a B++ potential is well known within the art and the waveform is typically a parabolic one and is shown in FIG. 2C as having a substantially parabolic waveform. The waveform may have a peak-to-peak value of, for example, 150 volts, and which varies at the horizontal line frequency of 15,750 Hz. with the cusps of the waveform occurring at the retrace portion of the horizontal scanning cycle.

The parabolic waveform of FIG. 2C thus appears at the terminal T3 at a point C in FIG. 1 and is applied to the bottom end of the capacitor C1. The parabolic waveform C of FIG. 2C is thus coupled through the capacitor C1 to the junction J2 where the waveform B of FIG. 2B is also applied. The parabolic waveform C at the horizontal rate is thus modulated at the vertical rate of the waveform B of FIG. 2B, with the modulated waveform being shown at D of FIG. 1 as the waveform of FIG. 2D. The waveform D which comprises the horizontal parabolic waveform modulated at the vertical rate appears at the anode of the diode D1. To the cathode of the diode D1 at the junction J3 the B+ potential is applied via the primary winding W3 of a transformer TF3. A tuning capacitor C3 is connected across the primary winding W3. The transformer TF3 include a secondary winding W4 which has its ends, respectively, connected to the ends of the yokes Y1 and Y2 via terminals T6 and T7. A tuning core 8 is provided for the transformer TF3.

Figure 2D:
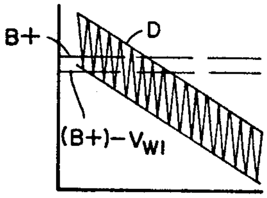

The voltage drop at the primary winding W3 of the transformer TF3 is negligible; therefore, the cathode of the diode D1 at the junction J3 is essentially held at the B+ potential. The DC voltage however at the anode of the diode D1 at the junction J2 is equal to the B+ potential less the voltage drop across the primary winding W1 of the transformer TF1. In FIG. 2D, the B+ voltage is indicated and the DC voltage at the anode of the diode D1 is indicated by the solid line $B+-V_{W1}$.

The capacitor C3 and the primary winding W3 of the transformer TF3 are so selected to resonate at the horizontal line frequency of 15,750 Hz. The tuning core 8 of the transformer TF3 may be adjusted to vary the peak-peak amplitude and phasing slightly, above and below 15,750 Hz.

With the cathode of the D1 being held at B+ potential, the diode D1 will conduct only when the voltage at the anode thereof exceeds the B+ potential. By referring to FIG. 2D, it can be seen that the diode D1 will translate current from anode to cathode whenever the voltage at the point D in FIG. 1 exceeds the B+ potential. Whenever the voltage at the anode of the diode D1 falls below the B2 level, the diode D1 will block the passage of current therethrough from anode to cathode. Thus the longer the anode of the diode D1 stays above the B+ level the longer the diode will translate current from anode to cathode therethrough.

Figure 2E:
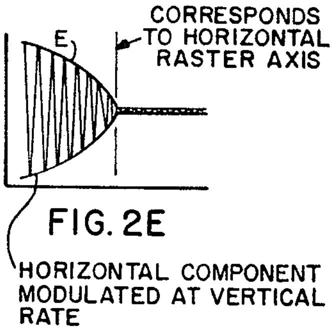

At the junction J3 at the cathode of the diode D1 the waveform E shown in FIG. 2E appears. It is seen that this waveform has maximum amplitude at the beginning of the vertical trace period and decreases as the vertical trace approaches the horizontal raster axes indicated by the solid line in FIG. 2E. The tuning core 8 of the transformer TF3 is adjusted to vary the peak amplitude and phasing of the waveform E so that maximum straightening of the horizontal lines of the top of the raster is accomplished, with the correction waveform providing minimum correction at the horizontal raster axis wherein no correction is required for the proper deflection of the electron beam.

The waveform E thus appearing across the primary winding W3 of the transformer TF3 is transformed to the secondary winding W4 thereof appearing across terminals T6 and T7 which are connected in series with the vertical deflection yokes Y1 and Y2. The windings W3 and W4 are so arranged that the transformed waveform E appearing at the secondary winding W4 is algebraically added to the sawtooth waveform A which appears across terminals T1 and T2 from the vertical trace period the waveform E as transformed algebraically alters the magnitude of the vertical sawtooth A. The effect is maximum at the beginning of scan and gradually decreases in a predetermined manner to a minimum corresponding to the horizontal raster axis as shown in FIG. 2E. In such a manner the vertical deflection current is algebraically altered, viz, at the beginning of the vertical trace cycle, with reference to one horizontal line of scan at a time, the amount of deflection of the electron beam is decreased and increased algebraically to cause the horizontal line or lines of scan at the top of the raster to appear substantially straight rather than bowed in at the top portion of the screen display.

Figure 3:
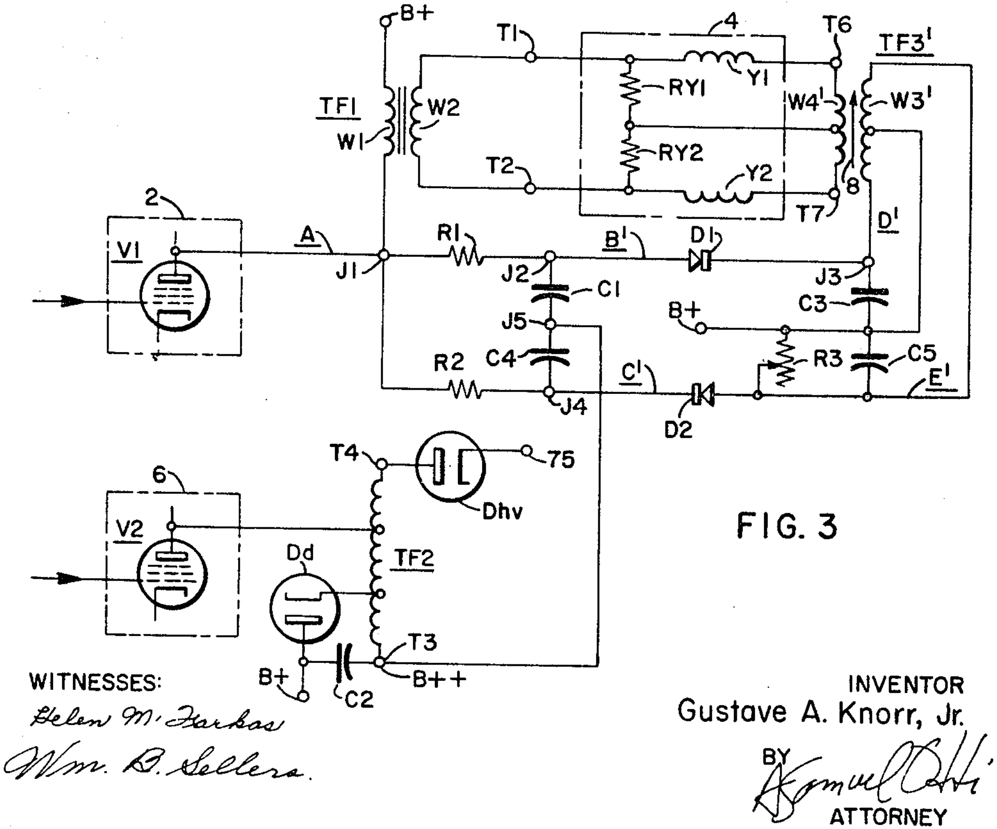
FIG. 3 is a schematic diagram of a second embodiment of the present invention.
Figure 4B:
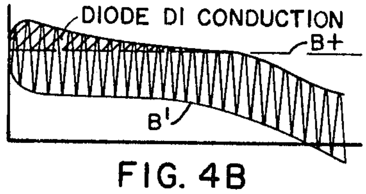

Referring now to FIG. 3, a second embodiment of the present invention is shown which provides pincushion distortion correction for both the top and bottom of the picture tube. As in FIG. 1 the standard vertical sawtooth is developed a point A at the output of the vertical output tube V1. The sawtooth is applied to the vertical output transformer TF1, with the output thereof being applied to the vertical deflection system 4 via terminals T1 and T2. The sawtooth waveform A is also applied to the resistor R1, the capacitor C1 and the diode D1 wherein this waveform is integrated as previously discussed. A parabolic waveform is developed at terminal T3 at the B-boost point at the bottom end of the high voltage transformer TF2 and is applied to the bottom end of the capacitor C1. The parabolic waveform is shown in FIG. 2C. The parabolic waveform is then coupled via the capacitor C1 to the junction J2 at the anode of the diode D1 and provides a modulated waveform which is modulated at the vertical rate. This waveform appearing at the anode of the diode D1 is indicated at the point B′ and is shown in FIG. 4B. In FIG. 3 a transformer TF3′ is provided corresponding to the transformer TF3 of FIG. 3; however, this transformer is provided with a center tapped primary winding W3′ and a center tapped secondary winding W4′. The B+ source is connected to the center of the primary winding W3′ and thereby effectively clamping the cathode of the diode D1 to the B+ potential. The diode D1 therefore will conduct from anode to cathode whenever its anode potential exceeds that of its cathode. As shown in FIG. 4B by the shaded area, the diode D1 conducts whenever the anode potential as illustrated by the curve B′ of FIG. 4B exceeds the B+ potential.

A capacitor C3 is connected between the junction J3 and the center tap of the winding W3′ to provide a tuned circuit resonant at the horizontal line rate of 15,750 Hz. Thus in response to the conduction of the diode D1 the shaded portion of FIG. 4B further illustrated in FIG. 4D as the portion to the left of the horizontal raster axis is provided at the point D′ at the bottom end of the primary winding W3′ of the transformer TF3′ which has a large amplitude at the beginning of the vertical trace portion of the scanning cycle and diminishing upon approaching the horizontal axis. The operation as so far discussed is substantially identical to that of FIG. 1 with the correction waveform as coupled through the transformer TF3′ modifying the vertical sawtooth as applied to the vertical deflection system to provide pincushion distortion correction at the top of the picture tube.

Figure 4C:
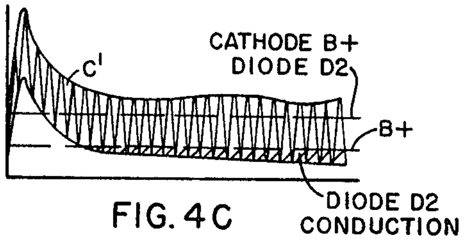

In order to provide pin cushion distortion correction at the bottom of the picture tube at the end of the vertical trace period, the waveform A is applied to another integrating circuit including a resistor R2 connected between the junction J1 and a junction J4 and a capacitor C4 connected between the junction J4 and a junction J5 at the bottom end of the capacitor C1 where the B-boost parabola is supplied from the terminal T3 at the low voltage end of the high voltage transformer TF2. A diode D2 is connected with its cathode to the junction J4 and its anode to the top end of the center tapped primary winding W3′ of the transformer TF3′. The waveform A is only partially integrated due to the reverse polarity of the diode D2 as compared to the diode D1. In that the parabolic waveform at the terminal T3 is coupled through the capacitor C4, it is modulated at the vertical rate and appears as a waveform C′ as shown in FIG. 4C at the cathode of the diode D2. The anode of the diode D2 is returned to the B+ source via the primary winding W3′. Thus the diode D2 will conduct anode to cathode when the cathode of the diode D2 is at a lower potential than the anode thereon. When the diode D1 is conductive, the diode D2 is nonconductive. However, as the waveform C′ decreases below the B+ potential, the diode D2 will begin to conduct so that the diode D2 will be conductive during the shaded portion of the curve C′ as shown in FIG. 4C. A potentiometer R3 is connected between the B+ source and the anode of the diode D2 in order to provide a means of controlling the amplitude of and therefore the amount of correction voltage applied to the vertical scan circuit.

Figure 4D:
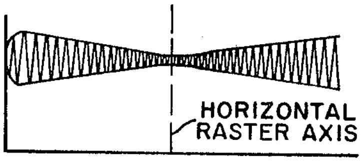

It is necessary to reverse the phase of the sinusoidal oscillations at the center of the vertical scan so that the distortion correction obtained is symmetrical; this is accomplished through the use of the center tapped primary and secondary windings W3′ and W′, respectively, of the transformer TF3′. A capacitor C5 is connected across the top half of the primary winding W3′ from the center tap to the top end thereof and is selected to resonate with the inductance of the primary winding W3′ at the horizontal line frequency of 15,750 Hz. Thus the waveform appearing at the point E′ of the top of the primary winding W3′ in response to the conduction of the diode D2 is shown in FIG. 4D as the waveform to the right of the horizontal raster axis. The center tap point of the secondary winding W4′ is connected to the junction between the resistors RY1 and RY2 of the vertical deflection system 4. The top output terminal T6 and the bottom output terminal T7 are, respectively, connected to the yokes Y1 and Y2 so that the composite waveform as seen in FIG. 4D appears as a correction waveform to modify the vertical retrace waveform as applied to the vertical deflection system via the terminals T1 and T2 so that this waveform is modified at the beginning and end of the vertical trace portion of the scanning cycle so as to decrease the scanning current at the beginning and end and thereby provide pincushion correction at the top and bottom of the raster. By the adjustment of the tuning core 8 of the transformer TF3′, the tuned circuits including the capacitor C3 and winding W3′ and the capacitor C5 and the winding W3′ can be adjusted to be slightly off resonance so that the proper amplitude and phasing of the correction waveform may be provided to accomplish the necessary pincushion correction at the top and bottom of the picture tube.

Figure 5:
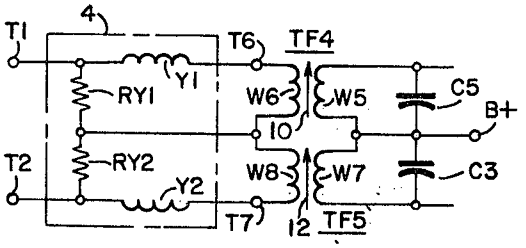
FIG. 5 is a schematic diagram showing a modification of FIG. 3 utilizing separate tuned transformers therein.

FIG. 5 shows a modification of FIG. 3 wherein separate transformers TF4 and TF5 are utilized for the transformer TF3′ rather than the center tapped primary and secondary windings. In FIG. 5 the transformer TF4 is utilized including a primary winding W5 and a secondary winding W6 and also a second transformer TF5 is provided including a primary winding W7 and a secondary winding W8. The bottom end of the primary winding W5 is connected to the top end of the primary winding W7, with the common connection being returned to the B+ source. The bottom end of the secondary winding W6 is connected to the top end of the secondary winding W8 with the common connection being returned to the junction between the resistors RY1 and RY2 of the vertical deflection system 4. The connections are otherwise identical to those shown in FIG. 3. However each of the transformers TF4 and TF5 have separate and adjustable tuning cores 10 and 12, respectively. Thereby the individual adjustment of the cores 10 and 12, the tuning of the respective transformers TF4 and TF5 may be accomplished separately so to achieve different tunings about the horizontal line frequency as desired to provide the desired pincushion correction respectively for the top and bottom of the picture tube. Thus, if a higher amplitude corrective waveform is required for the top portion of the picture tube this can be provided by the adjustment of the top tuning core 10 of the transformer TF4 to provide a higher peak-to-peak corrective waveform. While, on the other hand, if less correction is desired for the lower portion of the scan, the tuning core 12 of the transformer TF5 can be adjusted to provide a lower amplitude corrective waveform. Moreover, if it is desired only to provide top or bottom correction this can be accomplished by the adjustment of the tuning cores 10 and 12 to effect the elimination of one of the corrective waveforms at either the top or bottom of the vertical scan.

Alhough the present invention has been described with a certain degree of particularity, it should be understood that the present disclosure has been made only by way of example and that numerous changes in the details of circuitry and the combination and arrangement of parts, elements and components can be resorted to without departing from the spirit and the scope of the present invention.

I claim as my invention:

1. In a television receiver including a vertical deflection system, a pincushion correction circuit comprising:

a vertical source for providing a sawtooth waveform at a field repetition rate;

first means for applying said sawtooth waveform to said vertical deflection system;

a horizontal source for providing a parabolic waveform including a substantially parabolic component varying at a line repetition rate;

combining means for combining said sawtooth waveform and said parabolic waveform to provide a modulated waveform of said parabolic waveform modulated at said field rate;

a switching device;

second means for applying a reference voltage to one electrode of said switching device and said modulated waveform to the other electrode thereof so that portions of said modulated waveform differing from said reference potential are translated through said switching device;

transformer means for coupling said switching device and said deflection system to provide a correction waveform to said deflection system in response to said portion of said modulated waveform translated by said switching device so that said correction waveform modifies said sawtooth waveform to provide thereby pin cushion correction.

2. The circuit of claim 1 wherein:

said combining means including integrating circuit for integrating said sawtooth waveform for combination with said parabolic waveform.

3. The pincushion circuit of claim 2 wherein:

said integrating circuit including a resistor connected between said vertical source and said switching device and a capacitor connected between said switching device and said horizontal source.

4. The circuit of claim 3 wherein:

said transformer means comprising a tuned transformer operative to be tuned around and including said line repetition rate.

5. The circuit of claim 4 wherein:

said horizontal source comprising means for supplying a boosted operating voltage having a substantially parabolic component thereon for providing said parabolic waveform.

6. The circuit of claim 5 wherein:

said one electrode of said switching device being the cathode electrode thereof and said other electrode being the anode electrode thereof.

7. The pincushion correction circuit of claim 1 wherein:

said transformer means including a winding having a pair of end terminals, said switching device comprising a first switching device connected between said combining means and one of said pair of end terminals; and including a second switching device operatively connected between said combining means and the other end terminal of said pair of terminals, with the opposite type of electrode of said first and second switching device being connected to the respective end terminals, said second means including third means for applying a reference voltage to one electrode of said second device and said modulated waveform to the other electrode thereof so that portions of said modulated wavefore below said reference potential are translated through said second switching device, said first and second devices being so poled and said reference potential being so applied thereto that said first and second devices alternately translate portions of said modulated waveform therethrough during alternate portions of each field so that a correction waveform is provided at both ends of the vertical deflection cycle to provide pincushion correction.

8. The circuit of claim 7 wherein:

said combining means including first and second integrating means for respectively integrating said sawtooth waveform for combination with said parabolic waveform and application respectively to said first and second switching devices.

9. The circuit of claim 8 wherein:

said first integrating circuit including a first resistor connected between said vertical source and said first switching device and a first capacitor connected between said first switching device and said horizontal source, said second integrating circuit including a second resistor connected between said vertical source and said second switching device and a second capacitor connected between said second switching device and said horizontal source.

10. The circuit of claim 9 wherein:

said horizontal source comprising means for supplying a boosted operating voltage having a substantially parabolic component thereon for providing said parabolic waveform to said first and second capacitors.

11. The circuit of claim 10 wherein:

said winding including a tap thereon, said one electrode of said first switching device comprising the cathode electrode thereof and said other electrode comprising the anode electrode thereof, said one electrode of said second switching device comprising the anode electrode thereof and said other electrode comprising the cathode electrode thereof, said source of operating potential being connected to said tap on said winding.

12. The circuit of claim 7 wherein:

said winding having a tap thereon, said transformer means comprising a tuned transformer with a first tuning capacitor connected between one of said end terminals and said tap on said winding and a second tuning capacitor connected between said other end terminal and said tap, said tuned transformer operative to be tuned about and including said line repetition rate.

13. The circuit of claim 7 wherein:

said transformer means including a pair of tuned transformers respectively coupling said first and second switching device to said deflection systems and being individually adjustable to vary the tuned frequency thereof about and including said line repetition rate so that said correction waveform can be separately adjusted at both end of said deflection cycle.

References Cited

UNITED STATES PATENTS 3,320,469 5/1967 Slavik -------------- 315—24

RODNEY D. BENNETT, JR., *Primary Examiner.*

T. H. TUBBESING, *Assistant Examiner.*